Figure 1:
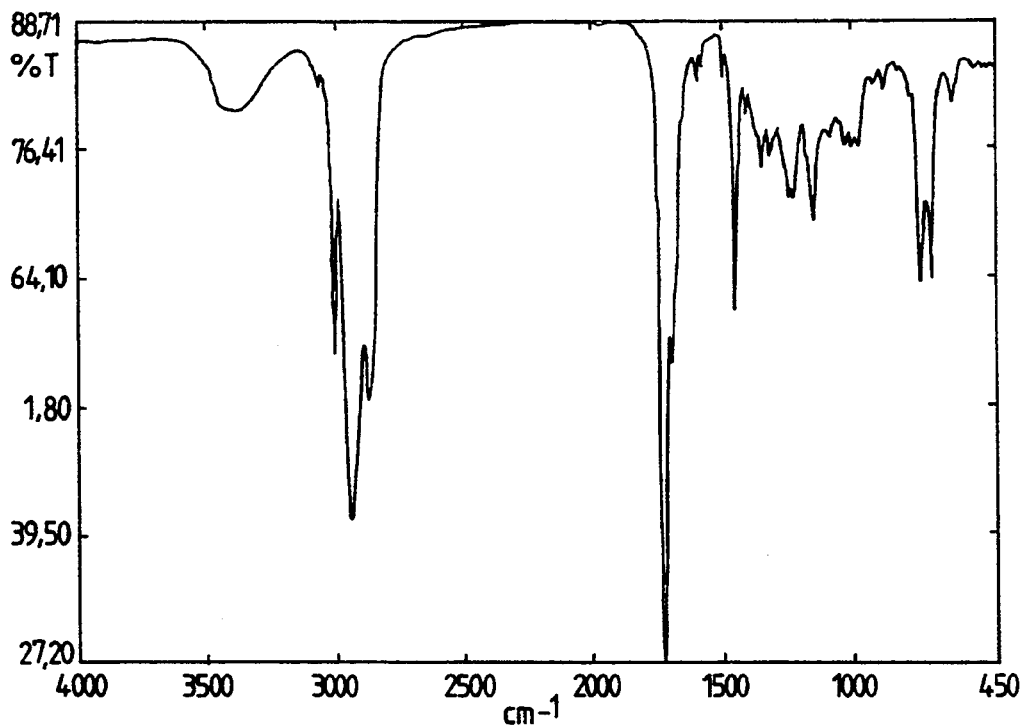

United States Patent [19]

Sommazzi et al.

[11] Patent Number: 5,369,187

[45] Date of Patent: Nov. 29, 1994

[54] POLYMERS CONTAINING REPEATING CYCLOKETONIC UNITS, AND METHOD FOR OBTAINING THEM

[75] Inventors: Anna Sommazzi, S. Margherita Ligure; Nicoletta Cardi, Olgiate Olona; Fabio Garbassi, Novara; Chrissostomos Chatgilialoglu, Monghidoro, all of Italy

[73] Assignees: Consiglio Nazionale Delle Ricerche, Rome; Enichem S.p.A., Milan, both of Italy

[21] Appl. No.: 71,517

[22] Filed: Jun. 3, 1993

[30] Foreign Application Priority Data

Jun. 4, 1992 [IT] Italy .................. MI92 A 001377

[51] Int. Cl.⁵ .................. C08F 8/00; C08G 67/02
[52] U.S. Cl. .................. 525/332.8; 525/332.9; 525/333.1; 525/333.2; 525/381; 525/383; 528/392
[58] Field of Search ............. 525/332.8, 332.9, 333.1, 525/333.2, 383; 568/381

[56] References Cited

U.S. PATENT DOCUMENTS

| 4,284,821 | 8/1981 | Martin et al. | 568/381 |
| 4,981,916 | 1/1991 | Willis | 525/383 |

*Primary Examiner*—Nathan M. Nutter
*Assistant Examiner*—Shelley A. Dodson
*Attorney, Agent, or Firm*—George P. Hoare, Jr.

[57] ABSTRACT

Polymers having a very good combination of chemical, mechanical and process properties, and particularly useable either alone or as mixtures, as high-tenacity thermoplastic polymer and as elastomers or elastomeric modifiers, contain, randomly distributed along their chain, repeating cycloketonic structural units having the following general formula (I):

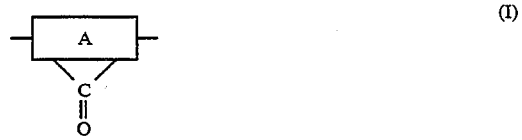

wherein:
A represents a tetravalent aliphatic or cycloaliphatic, substituted or non-substituted moiety containing a total number of from 4 to 50, preferably from 4 to 20, carbon atoms.

Such polymers can be prepared by means of a process which comprises reacting, in a liquid media, a polydiene containing adjacent structural units derived from the 1,4-cis polymerization of conjugated dienes, with carbon monoxide, in the presence of free radical generating compounds and, optionally, a compound capable of acting as a hydrogen donor.

37 Claims, 2 Drawing Sheets

POLYMERS CONTAINING REPEATING CYCLOKETONIC UNITS, AND METHOD FOR OBTAINING THEM

The present invention relates to polymers containing repeating cycloketonic units and to a method for producing them.

In particular, the present invention relates to novel polymers which can be used, either pure or as mixtures, both as thermoplastic materials and as elastomers, containing, randomly distributed along their chain, repeating cyclic units containing at least one in-ring ketonic group, and to a method for obtaining them.

Chemically modified polymers have recently gained an increasing importance in the industry of rubbers and plastic materials. They are considered as an interesting alternative route for synthetizing novel polymers, in order to obtain new materials which often are difficult or too expensive to prepare by means of conventional polymerization techniques.

Unsaturated polymers, in particular poly(conjugated dienes), are particularly suitable polymers for being chemically modified, both due to their technological importance, and because the presence of double carbon-carbon bonds in their polymeric chain turns them into substrates capable of reacting with a high number of different modifiers.

Conjugated polydienes, also commonly referred to as "dienic rubbers", are widely used in the manufacture of impact-resistant polymeric materials such as ABS, MBS, HIPS, and so forth. They furthermore play a basic role in the elastomer industry, with particular reference to the sector of tires.

In all of these applications, usually blends of polydienes with other organic or inorganic materials are prepared, the properties of which are influenced by the mutual compatibility of the several components. For example, in the production of ABS or HIPS, dienic rubbers are mixed or chemically combined with styrene derivatives, and, in the preparation of tires, such rubbers, before being vulcanized, are blended with mineral fillers and carbon black.

Those skilled in the art are very well aware of the problem of compatibilization of polymers with one another and with other materials frequently requiring the use of modified polymers or of polymeric additives, precisely designated as "compatibilizers". The great development, above all during the past years, of the polymeric blends caused an increasing demand for more and more adaptable polymers to the preparation of specific compositions.

Owing to its polar nature, low cost and large availability, carbon monoxide (CO) has been regarded as a useful comonomer or modifier agent for the preparation of novel polymers. However, owing to its typical reactivity, not many cases exist in which this compound has been used in chemistry and in the polymer industry.

Carbon monoxide is capable of adding to unsaturated carbon-carbon bonds. So, for example, in hydroformylation reactions, generally catalyzed by transition metal compounds, one molecule of carbon monoxide and one hydrogen molecule are selectively added to a double bond of olefinic character in order to form an aldehyde moiety.

From scientific literature, hydroformylation reactions also are known which are carried out on substrates constituted by poly(conjugated dienes).

So, e.g., S. J. Tremont et al., in their paper "Macromolecules" vol.23, page 1984 (1990), describe the hydroformylation of 1,2-polybutadiene and of cis-1,4-polybutadiene performed by causing these polymers to react with carbon monoxide in the presence of a rhodium complex as the catalyst. In European patent application EP 313,150, the reaction is disclosed of a dienic polymer with carbon monoxide and methanol in the presence of a complex of palladium and of a non-halohydride acid, in order to obtain a functionalized polymer with pendant methoxycarbonyl groups.

None of the above cited documents reports on the formation of cyclic structures during the reaction of polydienes with carbon monoxide.

It is known as well that carbon monoxide can react, in the presence of nickel carbonyl based catalysts, with low molecular weight compounds containing double $C=C$ bonds separated by at least two saturated carbon atoms, So, e.g., G. P. Chiusoli et al, in "Transition Metal Chemistry", vol.1, page 147 (1976), describe products containing cyclopentanones derived from the reaction of trans, trans-1,5,9,13-decatetratetraene with carbon monoxide in the presence of Ni-tetracarbonyl.

Polymers and copolymers containing a random distribution of ketonic groups along their chain were obtained by causing carbon monoxide to react with one or more olefinic derivatives in the presence of free radical generator compounds.

So, e.g., in U.S. Pat. No. 2,495,286, disclosed are copolymers of ethylenically unsaturated compounds and carbon monoxide, which are obtained by causing a mixture of these monomers to react in the presence of peroxides. In U.S. Pat. No. 4,024,325, the preparation is disclosed of copolymers with a random distribution of ethylene and carbon monoxide, which preparation is carried out by reacting said comonomers at temperatures comprised within the range of from 60° to 70° C. and under CO pressure, in the presence of peresters.

These copolymers are generally difficult to process, owing to their low thermal stability which causes the resulting manufactured articles to become yellow and brittle.

From literature, it is known as well that alternating polymers can be obtained by reacting olefins and carbon monoxide with palladium derivatives as catalysts, as disclosed, e.g., in European patent applications EP-A-121,965, EP-A-235,866 and EP-A-146,683.

None of the above said polymers, whether obtained by direct synthesis by starting from monomers, or obtained by modifing pre-existing polymers, contain in their chain cyclic structures containing an in-cycle carbonylic group.

The present applicant has surprisingly found now a new class of polymers containing in their chain repeating cycloaliphatic structural units containing a ketonic group inserted in their ring structure. These polymer, display an extremely good combination of chemical, mechanical and process properties and are particularly useable either alone or as mixtures, both as high-tenacity thermoplastic polymers, and as elastomers or elastomeric modifiers.

According to another aspect of the present invention, such new polymers can be obtained by reacting a cis-1,4-poly-1,3-diene with carbon monoxide in the presence of a free-radical generating compound and, optionally, of a hydrogen donor compound.

Therefore, the subject matter of the present invention are polymers containing, randomly distributed along their chain, repeating cycloketonic structure units having the following general formula (I):

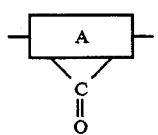 (I)

wherein:
A represents an aliphatic or cycloaliphatic, substituted or non-substituted, tetravalent moiety, containing total number of 4 to 50, preferably of from 4 to 20, carbon atoms.

A further subject matter of the present invention is a process for preparing the above said polymers, which process comprises causing, in a liquid media, a polydiene containing adjacent structural units derived from the 1,4-cis polymerization of conjugated dienes, to react with carbon monoxide in the presence of free-radical generating compounds and, possibly, of compound capable of acting as a hydrogen donor.

In the polymers according to the present invention, the moiety A is generally constituted by a main backbone of an alkylene, alkenylene, alkylenecycloalkylene or alkenylcycloalkylene type, only formed by carbon atoms, which links the four valency points with one another, and the possible substituent bonded to said backbone can be, besides hydrogen, from 1 to 6 chlorine and/or fluorine atoms, from 1 to 2 atoms of carbonylic oxygen, or linear or branched alkyl groups of from 1 to 10, preferably from 1 to 5 carbon atoms, or aliphatic groups of from 1 to 8 carbon atoms and containing ester, ether or amino groups in any positions, which are not bonded to the polymer backbone with an oxygen or nitrogen atom.

The expression "repeating" as used in the present invention, relates to an average content of at least three units of each cyclic structure per each polymer molecule.

In the present invention, preferred are those polymers which contain, randomly distributed along their chain, repeating cycloketonic structure units having the following general formula (II):

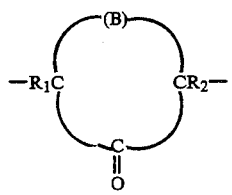 (II)

wherein:
$R_1$ and $R_2$, which may be the same or different, are hydrogen, or fluorine or chlorine, or an alkyl group of from 1 to 8, preferably from 1 to 5, carbon atoms, and
(B) is a linear, either substituted, or non-substituted, alkylenic or alkenylenic moiety of from 2 to 20, preferably from 2 to 7, carbon atoms in its main chain.

Particularly preferred polymers of the present invention are those containing, randomly distributed along the polymer chain, cyclopentanonic structures in which the moiety (B) of formula (II) is a substituted or non-substituted ethylenic group having the following formula (III):

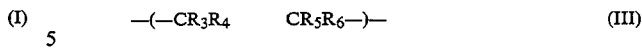 (III)

in which:
$R_3$, $R_4$, $R_5$ and $R_6$, which may be the same or different, are hydrogen, or a fluorine or chlorine atom, or an alkyl group of from 1 to 8, preferably from 1 to 5, carbon atoms or an aliphatic group not bonded to the cycle with an oxygen or nitrogen atom, containing from 1 to 6 carbon atoms and containing ether, ester and/or amino groups.

Particular examples of substituents $R_1$ or $R_2$ are chlorine, fluorine, or aliphatic alkyl groups such as methyl, ethyl, propyl, butyl, isobutyl, hexyl, 5-methylhexyl, and so forth.

Examples of substituents $R_3$, $R_4$, $R_5$ and $R_6$ are chlorine, fluorine, or aliphatic alkyl groups, such as methyl, ethyl, propyl, butyl, isobutyl, hexyl, 5-methylhexyl and so forth, or oxygen-containing groups, such as hydroxymethyl, methoxymethyl, ethoxyethyl, methylcarboxyethyl; or nitrogen containing groups, such as aminomethyl, aminoethyl, methylaminoethyl, and so forth.

In the following, some examples are reported of structural units which fall within the scope of at least one of the preceding formulae (I), (II) or (III), which should be considered as being supplied for merely illustrative purposes, and in no way shall be regarded as being limitative of the scope of protection of the invention.

For exemplifing purposes, in the following structures the hydrogen atoms are not shown.

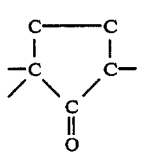 (IV)

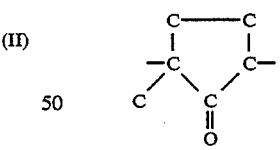 (V)

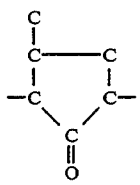 (VI)

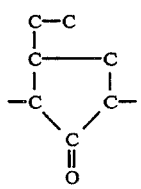 (VII)

-continued (VIII) 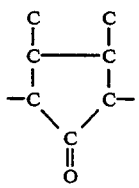

(IX) 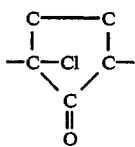

(X) 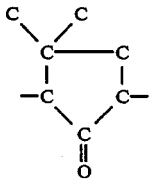

(XI) 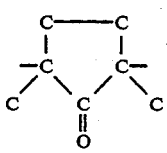

(XII) 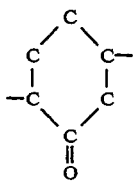

(XIII) 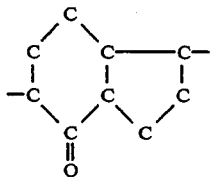

(XIV) 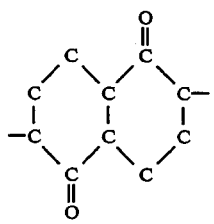

(XV) 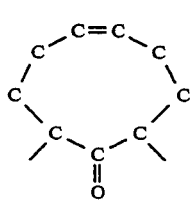

-continued (XVI) 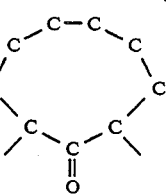

Such units may be contained in the polymeric chain either alone or in mixture with one or more of the other cycloketonic units.

The structural units containing cyclopentanone and-/or cyclohexanone structures are those which are more commonly present in the polymers according to the present invention and preferably constitute from 80 to 100% of total cycloketonic units contained in the polymeric chain. Their mutual molar ratio, when both of them are present in the same polymer, may vary within a wide range, according to the experimental conditions under which the polymers are obtained, and generally is a numeral which is higher than zero and may be as high as 5 and, preferably, is comprised within the range of from 0.1 to 2.

The polymers according to the present invention show in their I.R. Spectrum, characteristic carbonylic bands which are typical of cycloketone structures. Such bands ape usually centered around the frequency of 1730 cm$^{-1}$, expressed as wave numbers, for cyclopentanone units, and of 1700 cm$^{-1}$ for cyclohexanone units. Other cycloketonic structures containing more than 6 carbon atoms display I.R. bands centered between 1650 and 1700 cm$^{-1}$. Such I.R. bands may be used in order to characterize the, polymers of the present invention.

The content of cycloketonic structural units in the polymers of the present invention is a function of the amount of ketonic groups (carbonylic CO) present. The amount of carbonylic CO may range within wide limits, and generally is larger than 0.1% by weight relative to the total polymer weight and may reach a maximal level of 34% by weight. The content, by weight, of carbonylic CO is preferably comprised within the range of from 1 to 30% by weight relative to the total weight of the polymer.

The polymers according to the present invention usually have weight average molecular weight values comprised within the range of from 5,000 to 1,200,000, preferably comprised within the range of from 20,000 to 500,000. The weight average molecular weight of the polymers is calculated through gel permeation chromatography (GPC) measurements in tetrahydrofuran (THF).

In the polymers of the present invention, the cycloketonic structural units are linked to each other, along the polymer backbone, either by means of simple carbon-carbon bonds (adjacent units), or by means of alkylenic or alkenylenic, either substituted or non-substituted units, containing at least 4 carbon atoms.

Structural units which are preferably contained between two cycloketonic structures of the polymers according to the present invention are, e.g., those as represented by the following formula (XVII)

$$\text{+CR}_3\text{R}_4\text{—CR}_1\text{=CR}_2\text{—CR}_5\text{R}_6\text{+}_x \quad \text{(XVII)}$$

in which $R_1$, $R_2$, $R_3$, $R_4$, $R_5$ and $R_6$ have the same meaning as defined in formulae (II) and (III), and x is an integer comprised within the range of from 1 to 5,000 and preferably of from 1 to 200, or by the corresponding saturated formula.

Particularly interesting polymers for the purposes of the present invention are those in which the cycloketonic units are prevailingly grouped as blocks of adjacent units in the polymeric chain, with the balance of the chain being in general constituted of formula (XVII).

The polymers according to the present invention can be prepared by means of a process comprising reacting, in a liquid media, a polydiene containing adjacent structural units derived from 1,4-cis polymerization of conjugated dienes, with carbon monoxide in the presence of free-radical generating compound.

The process for obtaining the polymers of the present invention can be applied to any conjugated polydienes which contain in their backbone at least some sequential units derived from 1,4-cis polymerization of dienic monomers.

The polymerization of conjugated dienes is known to be capable of generating a plurality of polymers, according to the used method and of the reaction mechanism. In fact, at least three different modalities can be distinguished according to which a diene can enter the chain during the course of polymerization. These are the insertions of 1,4-cis, 1,4-trans and 1,2 types, generally known to those skilled in the art. The combination of these three insertion modes causes polymers to be formed with different structures and properties according to which modality is the prevailing one.

The present applicant found that, according to the process of the present invention, the cyclocarbonylic structures having formula (I) are formed when the conjugated polydienes which are used as reactants have molecules containing, in their chain, adjacent monomeric units inserted in 1,4-cis mode.

Preferably, the process according to the present invention comprises reacting carbon monoxide with polydienes, the content of 1,4-cis units of which is of more than 50%, by weight, relative to the total monomeric units.

In particular, those cis-1,4 polydienes are preferred for the present process which are derived from prevailingly 1,4-cis polymerization of dienes having the following general formula (XVIII):

$$CR_3R_4=CR_2-CR_1=CR_5R_6 \qquad (XVIII)$$

in which $R_1$, $R_2$, $R_3$, $R_4$, $R_5$ and $R_6$, which may be either the same or different from each other, have the same meaning as specified in formulae (II) and (III).

Particularly suitable for the invention are the polydienes of the above said type, which have a content of 1,4-cis units higher than 70% and preferably higher than 95% by weight.

Such cis-1,4-polydienes generally have a molecular weight comprised within the range of from 5,000 to 1,000,000. Polydienes having a molecular weight comprised within the range of from 20,000 to 400,000 are preferred.

The process according to the present invention is particularly applicable to the polydienes obtained by prevailingly 1,4-cis polymerization of 1,3-dienes, such as 1,3-butadiene, 2-methyl-1,3-butadiene, 2-chloro-1,3-butadiene, 1,3-pentadiene, 1,3-hexadiene, 2,3-dimethyl-1,3-butadiene.

Particularly preferred polydienes are polybutadiene and polypenta-1,3-diene and polyisoprene.

These polydienes are generally obtained by means of a polymerization of a Ziegler-Natta type. This type of polymerization is generally known and described in the literature. In particular, a wide and detailed description of the methods and catalysts used for 1,4-cis polymerization of 1,3-dienes is reported in "Comprehensive Polymer Science, 1st Edition", vol. 4 pages 53–108, Pergamon Press Editor, the contents of which are incorporated herein by reference.

The concentration of polydienes in the reaction mixture is a factor which has an influence on both the reaction rate and mechanism. In particular a decrease in the formation rate of cycloketonic units was observed at high polydiene concentrations. The concentration of polydiene in the liquid media is generally comprised within the range of from 0.5 g/l to 100 g/l, preferably of from 1 g/l to 20 g/l, as referred to the reaction mixture volume.

The polymers according to the present invention are preferably obtained by means of a process in which a polydiene in solution in an organic solvent is reacted with carbon monoxide in the presence of free radical generating compounds and, optionally, of at least one compound acting as a hydrogen donor.

Suitable solvents for thus purpose are all of non-reactive solvents capable of dissolving the poly-1,3-dienes used in the process. Particularly suitable for dissolving the polydienes with a high content of 1,4-cis units are the aromatic solvents, possibly also chlorinated, such as benzene, toluene, xylenes, tetralin, ethylbenzene, cumene, chlorobenzene, and so forth. Still other solvents suitable for the intended purpose are the aliphatic, linear, branched or cyclic hydrocarbons, such as hexane, heptane, trimethylpentane, cyclohexane, methylcyclohexane, and so forth, Furthermore, also oxygen containing solvents may be used, such as, e.g., tetrahydrofuran, ethyl ether, ethyleneglycol dimethyl ether, and so forth. From the several solvents, preferred are those which are capable of keeping in solution also the polymers containing the cyclocarbonylic structures formed during the course of the process, such as, e.g., toluene, xylenes, cyclohexane, tetrahydrofuran or a mixture thereof.

Free-radical generating compounds suitable for the present process, are all of those free-radical initiators generally known to those skilled in the art of free-radical processes and polymerization. They may be organic and inorganic peroxides and hydroperoxides such as hydrogen peroxide, di-t-butylperoxide, cumene hydroperoxide, dicumylperoxide, dibenzoylperoxide, laurylperoxide and the like; or, peracids, or their derivatives, such as peroxosulfates, peracetic acid, and the like. Azo-compounds, such as azobisisobutyronitrile, azobispropionitrile, and the like, can be used as well.

These free-radical initiators are generally used at lower concentrations than 5% by weight and generally at concentrations comprised within the range of from 0.001 to 5%, preferably of from 0.005 to 1% by weight, based on total reaction mixture weight.

Besides the true free-radical initiators, and together with them, also radicalic decomposition activators and promoters can be advantageously used, such as amines, redox systems based on transition metals, and, in general, all of those additives known in the art in order to favour and control a free-radical reaction.

Compounds acting as suitable hydrogen donors for the present process are those compounds which are capable of easily generating hydrogen radicals under the conditions of a radicalic reaction. Suitable compounds for this purpose ape, e.g., the silyl silanes of formula (XIX):

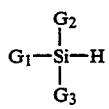
(XIX)

in which the moieties $G_1$, $G_2$ and $G_3$ independently are hydrogen, $C_1$-$C_6$ alkyl or $C_1$-$C_8$ alkylsilyl, and at least two of them are linked to a silicon atom by an Si—Si bond.

Preferred silylsilanes are tris (trimethylsilyl)silane, bis(trimethylsilyl)methylsilane.

Other hydrogen donor compounds suitable for the present process are the mercaptans (containing at least one S—H bond) and stannanes, characterized by the presence of at least one Sn—H bond.

The use of hydrogen donor compounds is not mandatory in the process according to the present invention; however, they are usually added to the action mixture at concentrations of up to 5% by weight relative to the weight of polydiene, and preferably at concentrations comprised within the range of from 0.01 to 0.5% by weight, still referred to polydiene weight.

The process according to the present invention suitably carried out at temperatures which depend on the typical decomposition temperature of the free-radical initiator, and preferably at temperatures higher than 30° C. and of up to 240° C. However, it was observed that temperature has an influence on the ratio of cyclohexanone units to cyclopenanone units, with the first ones being favoured at higher temperatures.

According to the present process, the reaction between carbon monoxide and a suitable polybutadiene takes place at any pressures. The process is however advantageously carried out in practice under CO pressures comprised within the range of from 30 to 150 atm.

The selection of temperature and of carbon monoxide pressure, as well as of the reaction time, has an influence on the amount of cycloketonic structural units formed in the polymers of the present invention, as well as on the ratio between the different units, in particular between cyclopentanone and cyclohexanone units, which are the generally prevailing ones.

According to a typical mode of carrying out the process, a solution of a polydiene, preferably polybutadiene or polyisoprene with a content of 1,4-cis units higher than 90% by weight, in an organic solvent; a free-radical generator compound such as, e.g., dibenzoylperoxide and a hydrogen donor compound such as, e.g., tris(trimethylsilyl)silane, are charged to an autoclave under an inert blanketing atmosphere. Then, carbon monoxide is added until a pressure is reached which is preferably comprised within the range of from 40 to 100 atm. The temperature is increased up to a value which depends on the free-radical initiator used in each specific case, but preferably is comprised within the range of from 50° C. to 150° C.

The process is preferably carried out under constant pressure with carbon monoxide being added in order to compensate for carbon monoxide consumed during the course of the reaction. The reaction mixture is kept with strong stirring in order to favour gas/liquid mixing.

At the end of the reaction, when no carbon monoxide absorbtion is observed any longer, the autoclave is cooled down to room temperature and the residual gases are vented off. The resulting polymer is purified by precipitation and successive washes and is finally dried.

In those cases in which obtaining a polymer containing a very large amount of cycloketonic units is desired, the above said process can be repeated once more, without isolating the product of the first reaction.

The polymers obtained by means of the above process can be isolated as such, or they can be submitted to a process of hydrogenation or of reduction of olefinic double bonds according to the techniques known from the prior art, in order to obtain saturated polymers containing cyclocarbonylic units, which are equally regarded as being part of the present invention.

Within the scope and for the purposes of the present invention, the above disclosed polymers containing repeating cycloketonic units may be admixed with one or more common additives generally known to those skilled in polymeric materials art, such as, e.g., antioxidants, plasticizers, stabilizers, tougheners, dyes and pigments. Typical antioxidants suitable for the polymers according to the present invention are, e.g., those products which are used for that purpose for polydienes, such as alkylphenols and, in particular, sterically hindered alkylphenols. Commonly used stabilizer agents are, e.g., the organic phosphites, as nonylphenylphosphite.

The polymers according to the present invention with a content of carbonyl function higher than 10% by weight are materials with good impact strength and good processability characteristics, which make them suitable for being processed by means of usual moulding and extrusion processes in order to obtain manufactured articles of plastics materials. When the carbonyl content is higher than 15%, preferably higher than 20% by weight, they also display a high resistance to attack by chemical agents and radiation.

The polymers according to the present invention with a carbonyl content lower than 10%, preferably lower than 5% by weight, are materials displaying an elastomeric behaviour, which can be used in the rubber industry. Due to their high content of olefinic unsaturations, they can be vulcanized by means of the usual vulcanization techniques in order to obtain rubber manufactured articles.

These low-carbonyl polymers are however also suitable for other uses, in particular as blends with other polymers. In fact, due to their structure constituted by blocks prevailingly formed by cycloketonic units and prevailingly polydienic blocks, they are relatively compatible with both polar polymers (polyesters, polyacrylates, polyamides, aromatic or aliphatic polyethers) and with polyolefins, styrene resins or polydienes. Therefore they, besides easily forming blends with one or more of the preceding polymers, can also act as polymeric compatibilizers in blends of polymers with different natures and polarities, in order to optimize their properties.

In order to better understand the present invention and for practicing it, some illustrative examples are reported in the following, which in no way should be regarded as being limitative of the same invention.

In all of the examples of preparation of the polymers of the present invention, as the starting polydiene a cis-1,4-polybutadiene with a content of 1,4-cis units of more than 98% and an average viscosimetric molecular weight of 200,000, as measured in toluene at 30° C., was used.

The characterization of the products obtained in the examples was carried out according to the following methodologies and measurement procedures:

Carbonyl CO Content

Computed as percent by weight based on total polymer weight, by starting from the content, by weight, of organic oxygen in the sample, by means of the equation:

$$CO\ content = [O_2\ content\ (sample)]/0.571$$

The organic oxygen content was obtained by using the instrument "Perkin-Elmer 2400-CHN Elemental Analyser", by direct determination by means of measurements of thermal conductivity carried out on the gases deriving from the pyrolysis of the sample.

The content of carbonylic CO in the polymers according to the present invention is an indirect measurement of the amount of structural cycloketonic units present in them.

I.R. Spectroscopy

On a Perkin-Elmer Mod. 1800 spectrometer, the spectra were recorded on polymeric films deposited on KBr pellets. The disclosure of the spectra reported in the following examples identifies the main bands on the bases of their frequency as wave numbers ($cm^{-1}$), and of their intensity (s=strong, m=medium, w=weak).

EXAMPLE 1

1.3 l of a toluenic solution containing 2 g of cis-poly-1,3-butadiene having the above mentioned characteristics, 0.46 ml of tris(trimethylsilyl)silane (TTMSS) and 1.5 g of laurylperoxide as free-radical initiator were charged under a nitrogen stream to an autoclave of 2 liters of AISI steel, equipped with mechanical stirring means and previously charged with a nitrogen atmosphere.

With stirring, carbon monoxide (99.99% pure) was then added, until a pressure of 60 atm was reached. The temperature of the mixture was increased up to 75° C. and such conditions were kept for approximately 6 hours.

During the course of the process, the pressure was kept constant by continuously feeding carbon monoxide in order to compensate for carbon monoxide consumed by the reaction.

After 6 hours, no gas absorbtion could be observed any longer. The autoclave was vented, and to the toluenic solution 2 liters of methanol was added with strong stirring in order to coagulate the product. After filtering and drying, 2.1 g was obtained of a polymeric product containing cycloketonic, prevailingly cyclopentanonic structures.

Product characterization
content of carbonylic CO: 10% by weight, corresponding to a theoretical content of cyclopentanonic structures of 30% by weight;
I.R. spectrum: main bands at (frequencies as $cm^{-1}$)
3010 m, 2940 s, 2870 m, 1730 s, 1700 w, 1650 w, 1450 w, 1240 w, 840 w, 740 m.

EXAMPLE 2

A process was carried out analogously to that disclosed in Example 1, but using 1.1 g of di-tert-butyl peroxide as free-radical initiator instead of lauryl peroxide, 10 microliters of TTMSS, and a reaction temperature 140° C. instead of 75° C.

At the end, 2 g of polymeric product containing cycloketonic structures with 5 or more carbon atoms was obtained.

Product characterization
content of carbonylic CO: 2% by weight;
I.R. spectrum: main bands at (frequencies as $cm^{-1}$)
3010 s, 2940 s, 2870 m, 1730 w, 1710 m, 1650 w, 1450 m, 1310 w, 990 w, 740 s.

The resulting polymer displays marked elastomeric characteristics; from its I.R. spectrum, the structural cycloketonic units contained in it appear to prevailingly be of the cyclohexanonic type.

EXAMPLES 3–8

Toluenic solutions containing PBD, TTMSS and dibenzoyl peroxide (DBP) as free-radical initiator were charged to an autoclave like the one as disclosed in Example 1, in such amounts as reported in Table 1 for each of the Examples 3 to 8.

In each case, a similar procedure to that disclosed in Example 1 was then carried out, with the CO pressure being kept in each case at such a value as specified in Table 1. The temperature was kept at 90° C., except in Example 8, in which the reaction was carried out at 80° C. Each reaction was carried out for 2 hours, but in Example 8, in which the reaction time was of 6 hours.

At the end of the reaction, a polymer containing a cyclocarbonylic structure was isolated, The amount of polymer and CO content are reported in Table 1 for each of Examples 3 to 8.

The polymers obtained in Examples 3 to 8 were characterized by I.R. spectroscopy. In particular, the I.R. spectrum of the polymer obtained in Example 6, containing 20% of CO by weight, is reported in accompanying FIG. 1 for reference purposes.

EXAMPLE 9

A toluenic solution containing 3.51 g of the same cis-1,4-polybutadiene as disclosed hereinabove and 1.08 g of azobisisobutyronitrile (AIBN) as a free-radical initiator was charged to the same reaction equipment as disclosed in Example 1 and prepared in the same way. Then, carbon monoxide was added until a pressure of 60 atm was reached, and temperature was increased up to 85° C.

The same procedure as Example 1 was followed and at the end of it, 3.4 g was obtained of a polymeric product containing cyclocarbonylic structures with 5 to 6 carbon atoms.

Figure 2:
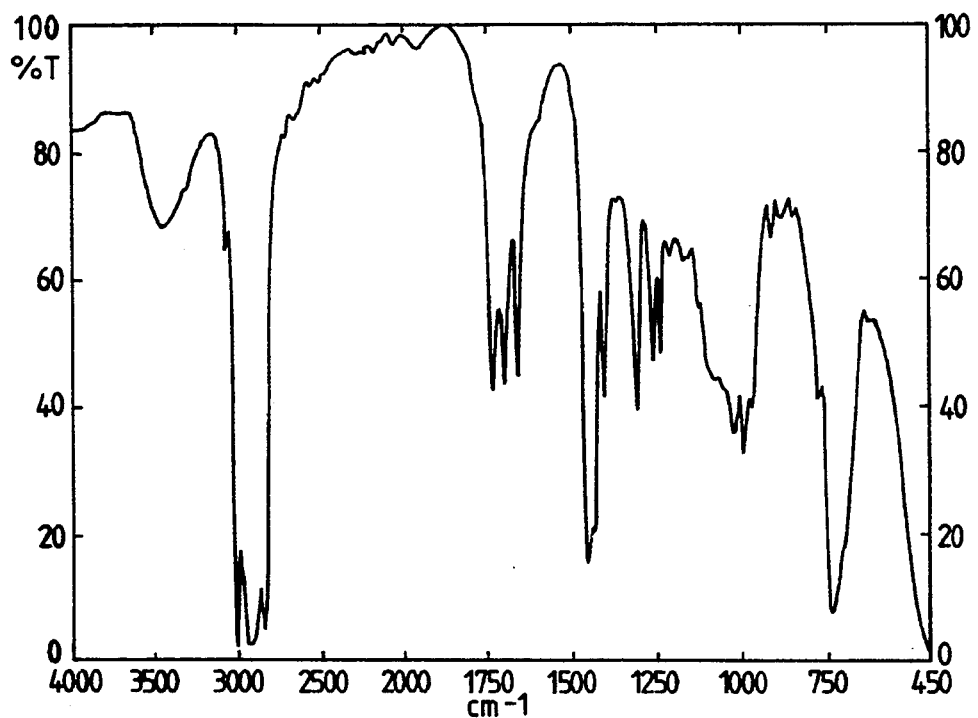

Product characterization
content of carbonylic CO: about 5% by weight;
I.R. spectrum: the I.R. spectrum of the product is reported in FIG. 2, for reference purposes.

The resulting product is characterized by a low CO content and displays mechanical properties which enable it to be classified among the elastomeric polymers.

EXAMPLE 10

A solution of 2 g of polybutadiene, 0.9 g of dibenzoyl peroxide and 3.68 mg of TTMSS in 1.3 liters of toluene was charged to a reactor as disclosed in Example 1.

Then, carbon monoxide gas was added until a pressure of 10 atm was reached, and the autoclave was heated up to a temperature of 90° C. The above conditions were kept constant for 5 hours by periodically adding carbon monoxide in order to compensate for carbon monoxide absorbed during the reaction. The autoclave was then cooled and the residual gases were vented.

Then, to the reaction mixture a further 100 ml of toluene containing 0.9 g of DBP and 3.7 microliters of TTMSS was added and temperatures were increased again to the above reported values. It was observed that carbon monoxide was not yet being absorbed. The reaction was continued for a further 5 hours. At the end, a polymeric product was obtained which contained 25% by weight of carbonylic CO, as computed from elemental analysis, corresponding to a theorical content of cyclopentanonic units of 75% by weight.

Figure 3:
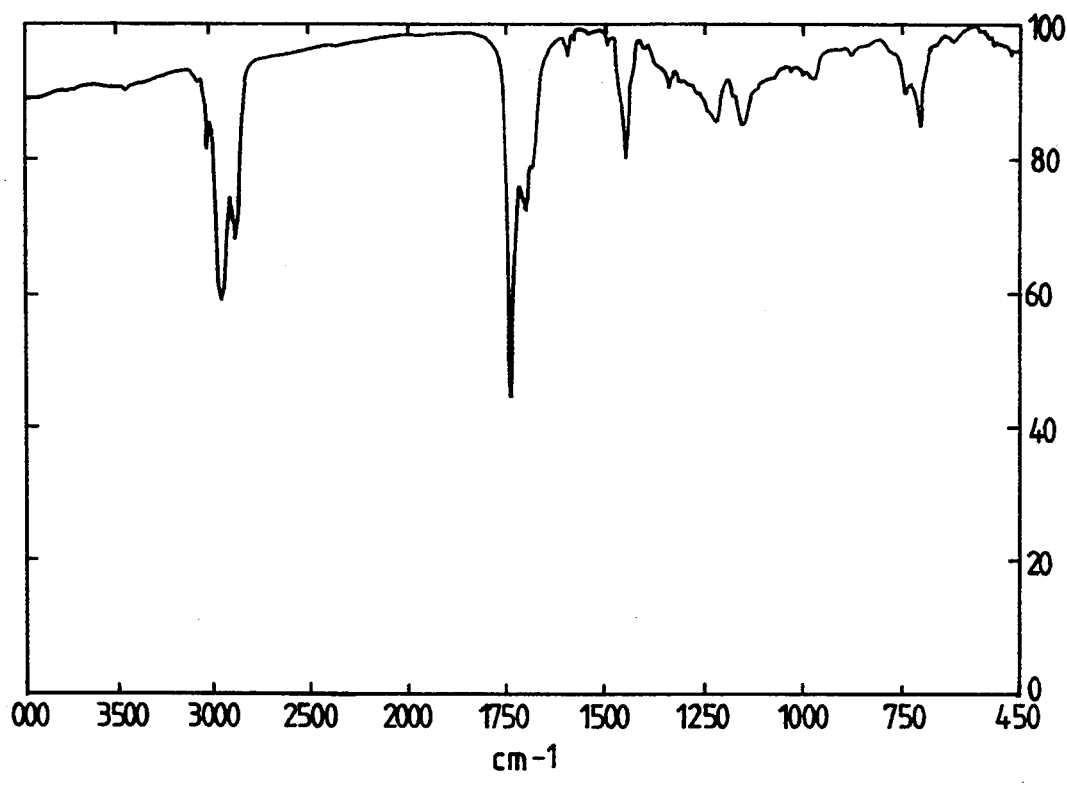

The infrared spectrum of the product obtained as said above is reported for reference purposes in FIG. 3.

The obtained product is characterized by a high CO content and, on the basis of a qualitative evaluation, displays mechanical properties which make it possible it to be classified among the amorphous, high-tenacity thermoplastic polymers,

TABLE 1

| Example | Volume (l) | PBD (g) | DBP (g) | TTMSS (μl) | $P_{co}$ (atm) | Yield (g) | CO content by weight |
|---|---|---|---|---|---|---|---|
| 3 | 2.3 | 4.0 | 1.8 | 10 | 60 | 4.6 | 17 |
| 4 | 1.3 | 4.0 | 1.8 | 10 | 60 | 4.5 | 15 |
| 5 | 1.3 | 1.0 | 0.45 | 2.5 | 60 | 0.5 | 14 |
| 6 | 1.3 | 2.0 | 0.9 | 5 | 100 | 2.4 | 20 |
| 7 | 2.3 | 8.0 | 1.8 | 10 | 100 | 9.1 | 16 |
| 8* | 1.3 | 2.0 | 1.8 | 5 | 100 | 2.5 | 25 |

*Temperature = 80° C., time = 6 hours

We claim:

1. A polymer containing, randomly distributed along its chain, repeating cycloketonic structural units having the following formula (I):

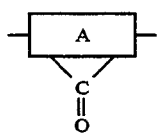

(I)

wherein:

A represents an aliphatic or cycloaliphatic, substituted or non-substituted, tetravalent moiety, containing a total number of 4 to 50 carbon atoms.

2. A polymer according to claim 1, in which A is constituted by an alkylene, alkenylene, alkylenecycloalkylene or alkenylcycloalkylene backbone, formed only by carbon and hydrogen atoms, which links the four valency points with one another, optionally substituted with from 1 to 6 chlorine and/or fluorine atoms, from 1 to 2 atoms of carbonylic oxygen, or linear or branched alkyl groups of from 1 to 10, carbon atoms, or aliphatic groups of from 1 to 8 carbon atoms and containing ester, ether or amino groups, which are not bonded to the polymer backbone with an oxygen or nitrogen atom.

3. A polymer according to claim 1, which contains randomly distributed along its chain, repeating cycloketonic structural units having the following formula (II):

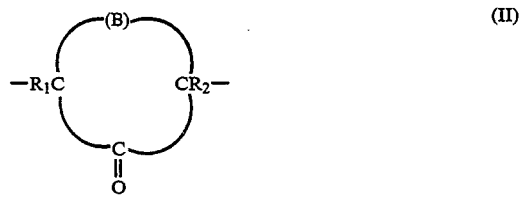

wherein:

$R_1$ and $R_2$, which may be the same or different, are hydrogen, or fluorine or chlorine, or an alkyl group of from 1 to 8 carbon atoms, and (B) is a linear, either substituted, or non-substituted, alkylenic or alkenylenic moiety of from 2 to 20 carbon atoms in its main chain.

4. A polymer according to claim 3, in which the moiety (B) of formula (II) is an ethylenic group having the following formula (III):

in which:

$R_3$, $R_4$, $R_5$ and $R_6$, which may be the same or different, are hydrogen, or a fluorine or chlorine atom, or an alkyl group of from 1 to 8 carbon atoms or an aliphatic group not bonded to the cycle with an oxygen or nitrogen atom, containing from 1 to 6 carbon atoms and containing ether, ester and/or amino groups.

5. A polymer according to claim 3, in which the substituents $R_1$, $R_2$, $R_3$, $R_4$, $R_5$ and $R_6$ are independently from one another, chlorine, fluorine, methyl, ethyl, propyl, butyl, isobutyl, hexyl, or 5-methylhexyl.

6. A polymer according to claim 3, in which from 80 to 100% of total cycloketonic units contained in the polymeric chain contain cyclopentanonic or cyclohexanonic structures.

7. A polymers according to claim 3, containing repeating cycloketonic structural units prevailingly having one of the following formulae IV), (V), (VI) and (IX):

-continued

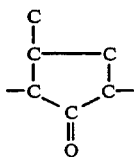
(VI)

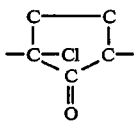
(IX)

8. A polymer according to claim 1, having a weight average molecular weight comprised within the range of from 5,000 to 1,200,000.

9. A polymer according to claim 1, characterized by a content of carbonylic CO comprised within the range of from 0.1 to 10% by weight relative to the total weight of the polymer.

10. A polymer according to claim 1, characterized by a content of carbonylic CO comprised within the range of from 10 to 34% by weight, relative to the total weight of the polymer.

11. A polymer according to claim 1, in which between two cycloketonic structural units, one or more structural units are contained, which are represented by the following formula (XVII)

$$+CR_3R_4-CR_1=CR_2-CR_5R_6+_x \quad \text{(XVII)}$$

in which
R$_1$, R$_2$, R$_3$, R$_4$, R$_5$ and R$_6$ have the same meaning as defined in formulae (II) and (III), and
x is an integer comprised within the range of from 1 to 5,000, or by the corresponding saturated formula.

12. Process for preparing the polymer according to claim 1, which process comprises causing, in a liquid media, a polydiene containing adjacent structural units derived from 1,4-cis polymerization of conjugated dienes, to react with carbon monoxide in the presence of free-radical generating compounds and, optionally, of a compound capable of acting as a hydrogen donor.

13. Process according to claim 12, in which more than 50% by weight of total monomeric units of polydiene derive from 1,4-cis polymerization of conjugated dienes.

14. Process according to claim 12, in which the polydiene is derived from prevailingly 1,4-cis polymerization of dienes having the following formula (XVIII):

$$CR_3R_4=CR_2-CR_1=CR_5R_6 \quad \text{(XVIII)}$$

in which
R$_1$, R$_2$, R$_3$, R$_4$, R$_5$ and R$_6$, which may be either the same or different, have the same meaning as specified in formulae (II) and (III).

15. Process according to claim 14, in which said polydiene has a content of units derived from 1,4-cis polymerization which is higher than 70% by weight.

16. Process according to claim 12, in which said polydiene has a weight average molecular weight comprised within the range of from 5,000 to 1,000,000.

17. Process according to claim 14, in which said polydiene is obtained by 1,4-cis polymerization of one or more of the compounds selected from the group consisting of 1,3-butadiene, 2-methyl-1,3-butadiene, 2-chloro-1,3-butadiene, 1,3-pentadiene, 1,3-hexadiene, and 2,3-dimethyl-1,3-butadiene.

18. Process according to claim 14, in which said polydiene is polybutadiene, or cis-polypenta-1,3-diene or polyisoprene.

19. Process according to claim 12, in which the concentration of polydiene in the liquid media is generally comprised within the range of from 0.5 g/l to 100 g/l, as referred to the reaction mixture volume.

20. Process according to claim 12, in which the liquid media is selected from toluene, xylenes, cyclohexane, tetrahydrofuran or a mixture of two or more thereof.

21. Process according to claim 12, in which the free-radical generating compound is a peroxide, a peracid, a hydroperoxide, a perester, or an azo-compound, and is used at a concentration comprised within the range of from 0.001 to 5%, based on total solution weight.

22. Process according to claim 12, in which the hydrogen donor compound is a silyl silane of formula (XIX):

(XIX)

in which the moieties G$_1$, G$_2$ and G$_3$ independently are hydrogen, C$_1$-C$_6$ alkyl or C$_1$-C$_8$ alkylsilyl, and at least two of them are linked to silicon atom by an Si—Si bond.

23. Process according to claim 12, in which the hydrogen donor compound is tris(trimethylsilyl)silane or bis(trimethylsilyl)methylsilane.

24. Process according to claim 12, in which the hydrogen donor compound is used in an amount comprised within the range of from 0.01 to 0.5% by weight relative to the weight of polybutadiene.

25. Process according to claim 12, in which the pressure of carbon monoxide is comprised within the range of from 30 to 150 atm.

26. Process according to claim 25, in which the pressure of carbon monoxide is kept constant throughout the course of the reaction.

27. Polymers obtained by means of the process according to claim 12.

28. A polymer according to claim 1, wherein A contains 4 to 20 carbon atoms.

29. A polymer according to claim 2, wherein said linear or branched alkyl groups contain from 1 to 5 carbon atoms.

30. A polymer according to claim 3, wherein said alkyl group contains from 1 to 5 carbon atoms and said alkylenic or alkenylenic moiety contains from 2 to 7 carbon atoms in its main chain.

31. A polymer according to claim 8 having a weight average molecular weight comprised within the range of from 200,000 to 500,000.

32. A polymer according to claim 9, wherein the content of carbonylic CO is from 1 to 5%, relative to the total weight of the polymer.

33. A polymer according to claim 10, wherein the content of carbonylic CO is from 20 to 34% by weight, relative to the weight of the polymer.

34. A polymer according to claim 11, wherein x is an integer of from 10 to 200.

35. A process according to claim 16 in which said polydiene has a weight average molecular weight comprised within the range of from 20,000 to 400,000.

36. A process according to claim 21 in which the free-radical generating compound is used at a concentration of from 0.005 to 1% by weight, based on total solution weight.

37. A process according to claim 25 in which the pressure of carbon monoxide is from 40 to 100 atm.

* * * * *